(12) United States Patent
Jaradi et al.

(10) Patent No.: US 12,012,063 B1
(45) Date of Patent: Jun. 18, 2024

(54) AIRBAG FOR CHILD-RESTRAINT SYSTEM

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/324,266

(22) Filed: May 26, 2023

(51) Int. Cl.
| | | |
|---|---|---|
| *B60R 21/015* | (2006.01) | |
| *B60R 21/207* | (2006.01) | |
| *B60R 21/2165* | (2011.01) | |
| *B60R 21/232* | (2011.01) | |

(52) U.S. Cl.
CPC .... *B60R 21/2072* (2013.01); *B60R 21/01556* (2014.10); *B60R 21/2165* (2013.01); *B60R 21/232* (2013.01); *B60R 2021/21654* (2013.01)

(58) Field of Classification Search
CPC ...................... B60R 21/2072; B60R 21/01556
See application file for complete search history.

(56) References Cited

U.S. PATENT DOCUMENTS

| | | | |
|---|---|---|---|
| 4,311,339 A | 1/1982 | Heath | |
| 4,500,135 A | 2/1985 | Kincheloe | |
| 4,834,420 A * | 5/1989 | Sankrithi | ................ B60R 22/10 297/250.1 |
| 5,375,908 A * | 12/1994 | Goor | ....................... B60R 21/01 297/488 |
| 6,296,292 B1 | 10/2001 | Feldman | |
| 9,238,425 B2 | 1/2016 | Fukawatase | |
| 9,428,138 B2 | 8/2016 | Farooq et al. | |
| 11,186,245 B2 * | 11/2021 | Kadam | ................. B60R 21/207 |
| 11,312,326 B2 | 4/2022 | Oh et al. | |
| 11,325,554 B1 * | 5/2022 | Faruque | ............ B60R 21/01512 |
| 11,351,946 B1 | 6/2022 | Faruque et al. | |

(Continued)

FOREIGN PATENT DOCUMENTS

| | | | | |
|---|---|---|---|---|
| DE | 102018101317 A1 * | 7/2018 | ............. | B60N 2/143 |
| DE | 102018120640 A1 * | 2/2019 | ............... | B60N 2/14 |

(Continued)

*Primary Examiner* — Nicole T Verley
(74) *Attorney, Agent, or Firm* — Frank A. MacKenzie; Bejin Bieneman PLC

(57) ABSTRACT

An assembly includes a seat having a seat bottom and a seatback supported by the seat bottom. The seat bottom, defining an occupant-seating area, has a seat-forward end and a seat-rearward end. An airbag is inflatable from an uninflated position to an inflated position and is supported on the seat bottom at the seat-forward end. The airbag has a cavity configured to receive a removable child-restraint system on the occupant-seating area. A pyrotechnic retractor is supported by the seat and operatively coupled to the airbag to position the cavity at the occupant-seating area. The assembly includes a computer including a processor and a memory storing instructions executable by the processor to detect a removable child-restraint system on the occupant-seating area and, based on detection of a removable child-restraint system, inflate the airbag to the inflated position in response to certain vehicle impacts.

20 Claims, 7 Drawing Sheets

(56) References Cited

U.S. PATENT DOCUMENTS

| | | | |
|---|---|---|---|
| 11,505,155 B1 | 11/2022 | Faruque et al. | |
| 11,618,404 B1 * | 4/2023 | Jaradi | B60R 21/23138 |
| | | | 280/730.1 |
| 11,787,361 B1 * | 10/2023 | Patel | B60R 21/23138 |
| | | | 280/730.2 |
| 2020/0114857 A1 * | 4/2020 | Jaradi | B60R 21/231 |
| 2020/0164828 A1 * | 5/2020 | Park | B60R 21/207 |
| 2020/0317154 A1 * | 10/2020 | Choi | B60R 21/207 |
| 2021/0039578 A1 * | 2/2021 | Rupp | B60R 21/207 |

FOREIGN PATENT DOCUMENTS

| | | | | |
|---|---|---|---|---|
| DE | 102022109168 A1 * | 10/2022 | | B60R 21/207 |
| DE | 202021103088 U1 * | 10/2022 | | |
| DE | 102022112988 A1 * | 12/2022 | | B60R 21/207 |
| DE | 102022116286 A1 * | 1/2023 | | B60R 21/207 |
| DE | 102022130931 A1 * | 6/2023 | | B60R 21/207 |
| DE | 102023103740 A1 * | 8/2023 | | B60R 21/23138 |
| DE | 102023112659 A1 * | 11/2023 | | B60R 21/01512 |
| DE | 102023113110 A1 * | 11/2023 | | B60R 21/207 |
| DE | 102023115565 A1 * | 12/2023 | | B60R 21/214 |
| DE | 102023118649 A1 * | 1/2024 | | |
| FR | 2741572 A1 | 5/1997 | | |
| WO | WO-9307026 A1 * | 4/1993 | | B60N 2/2839 |
| WO | WO-9313965 A1 * | 7/1993 | | B60R 21/01 |
| WO | 2012035300 A1 | 3/2012 | | |

\* cited by examiner

AIRBAG FOR CHILD-RESTRAINT SYSTEM

BACKGROUND

Vehicles are equipped with airbags which act as supplemental restraints for occupants during certain vehicle impacts. The airbags are located at various fixed positions in passenger compartments of vehicles. As examples, vehicles may include a driver airbag mounted in a steering wheel, a passenger airbag mounted in the top of a dash in a vehicle-forward direction from the front passenger seat, and side curtain airbags mounted in roof rails above the doors.

Removable child-restraint systems (CRS) are removable seats for seating and restraining children riding in a vehicle. Types of CRSs include rearward facing child seats, forward facing child seats, combination seats that can face rearward or forward, and booster seats. Rearward facing, forward facing, and combination child seats include a harness for restraining the child occupant. Booster seats rely on the seatbelts included with the vehicle. CRSs may be held in place by the seatbelt of the vehicle and/or may include tethers for attaching to tether attachment brackets of the vehicle.

Vehicles are equipped with anchors for anchoring the removable CRS to the vehicle. Specifically, the anchor may provide for anchoring of the removable CRS to a vehicle seat and/or to a body of the vehicle. CRSs include anchoring for connecting the anchor of the vehicle. The anchor of the vehicle and the anchoring system of the removable CRS may be configured to comply with a standard, e.g., ISOFIX (e.g., ISO216), which is an international standard for attachment points for child safety seats in passenger cars; LATCH ("Lower Anchors and Tethers for Children") in the United States; LUAS ("Lower Universal Anchorage System"); Canfix in Canada; UCSSS ("Universal Child Safety Seat System").

DETAILED DESCRIPTION

Figure 1:
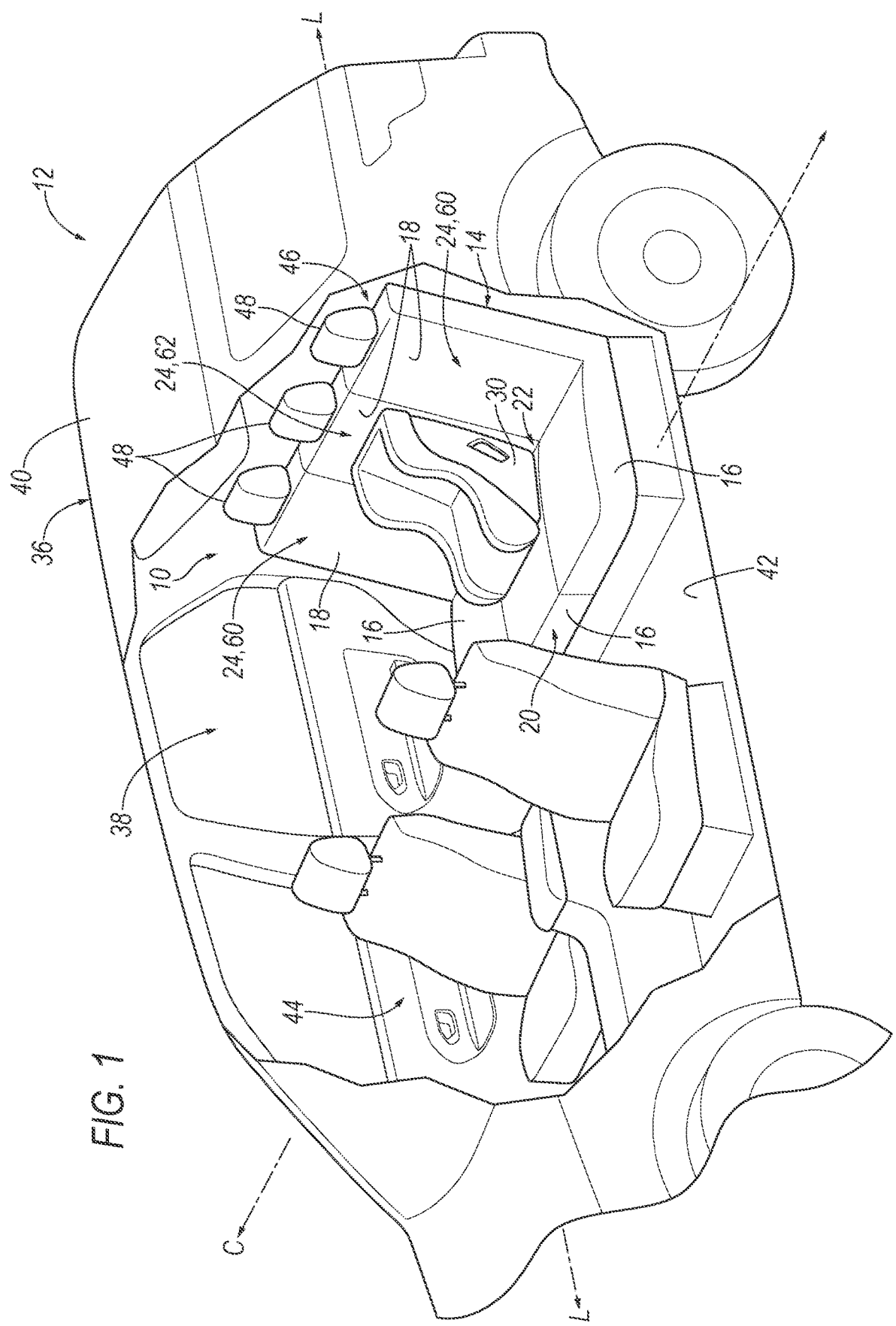
FIG. 1 is a perspective view of a vehicle including a vehicle seat and a removable child-restraint system (CRS) installed on the vehicle seat.

An assembly includes a vehicle seat having a seat bottom and a seatback supported by the seat bottom. The seat bottom has a seat-forward end and a seat-rearward end. The seat bottom defines an occupant-seating area. The assembly includes an airbag supported on the seat bottom at the seat-forward end. The airbag is inflatable from an uninflated position to an inflated position. In the inflated position, the airbag has a cavity configured to receive a removable child-restraint system on the occupant-seating area. The assembly includes a pyrotechnic retractor supported by the vehicle seat and operatively coupled to the airbag to position the airbag with the cavity at the occupant-seating area. The assembly includes a computer including a processor and a memory storing instructions executable by the processor to detect a removable child-restraint system (CRS) on the occupant-seating area and, based on detection of a removable child-restraint system on the occupant-seating area, inflate the airbag to the inflated position in response to certain vehicle impacts.

The airbag may include a first side portion and a second side portion spaced in from each other, a seat-forward portion, and a seat-upward portion to define the cavity. The occupant-seating area may be between the first side portion and the second side portion along a cross-seat axis when the airbag is in the inflated position. The occupant-seating area may be between the seat-forward portion and the seatback along a seat-forward axis. The occupant-seating area may be between the seat-upward portion and the seat bottom along a seat-upright axis.

The vehicle seat may define a first side and a second side spaced from the first side. The airbag may extend from the first side to the second side and the occupant-seating area being between the first side and the second side.

The assembly may include a tether extending from the pyrotechnic retractor to the airbag. The pyrotechnic retractor may be operatively coupled to the tether to position the airbag with the cavity at the occupant-seating area.

The assembly may include a second pyrotechnic retractor supported by the vehicle seat. The second pyrotechnic retractor may be spaced from the pyrotechnic retractor and operatively coupled to the airbag to position the airbag with the cavity at the occupant-seating area.

The assembly may include a second tether spaced cross-seat from the tether. The second pyrotechnic retractor may be operatively coupled to the second tether to position the airbag with the cavity at the occupant-seating area.

The assembly may include a third tether spaced downwardly from the second tether along the airbag. The third tether may extend from the second pyrotechnic retractor to the airbag and the second pyrotechnic retractor may be operatively coupled to the third tether to position the airbag with the cavity at the occupant-seating area.

The pyrotechnic retractor and the second pyrotechnic retractor may be supported by the seatback.

The assembly may include a second tether spaced downwardly from the tether along the airbag. The second tether may extend from the pyrotechnic retractor to the airbag and the pyrotechnic retractor being operatively coupled to the second tether to position the airbag with the cavity at the occupant-seating area.

The assembly may include a second pyrotechnic retractor supported by the vehicle seat. The second pyrotechnic retractor may be spaced from the pyrotechnic retractor and operatively coupled to the airbag to position the airbag with the cavity at the occupant-seating area.

The vehicle seat may define a first side and a second side spaced from the first side. The pyrotechnic retractor may be supported by the first side of the vehicle seat and the second pyrotechnic retractor supported by the second side of the vehicle seat.

The pyrotechnic retractor may be supported by the seatback.

The airbag may include a first inflation chamber and a second inflation chamber. The first inflation chamber and the second inflation chamber may define a gap elongated between the first inflation chamber and the second inflation chamber from the seat bottom to the seatback.

The first inflation chamber may be releasably connectable to the second inflation chamber at the gap.

The airbag may include a first inflation chamber and a second inflation chamber. The first inflation chamber and the second inflation chamber may define a gap elongated between the first inflation chamber and the second inflation chamber from a first end spaced upwardly from the seat bottom to a second end adjacent the seatback.

The assembly may include a buckle fixed to one of the first inflation chamber and the second inflation chamber and a clip fixed to the other of the first inflation chamber and the second inflation chamber. The clip may be releasably connectable to the buckle.

The first inflation chamber may be releasably connectable to the second inflation chamber at the gap.

The assembly may include a vehicle floor supporting the vehicle seat. The airbag may be between the seat bottom and the vehicle floor in the uninflated position.

The occupant-seating area may be between the airbag and the seatback when the airbag is in the inflated position.

With reference to the Figures, wherein like numerals indicate like parts throughout the several views, an assembly 10 for a vehicle 12 includes a vehicle seat 14 having a seat bottom 16 and a seatback 18 supported by the seat bottom 16. The seat bottom 16 has a seat-forward end 20 and a seat-rearward end 22. The seat bottom 16 defines an occupant-seating area 24. The assembly 10 includes an airbag 26 supported on the seat bottom 16 at the seat-forward end 20. The airbag 26 is inflatable from an uninflated position to an inflated position. In the inflated position, the airbag 26 has a cavity 28 configured to receive a removable child-restraint system on the occupant-seating area 24. The assembly 10 includes a pyrotechnic retractor 32 supported by the vehicle seat 14 and operatively coupled to the airbag 26 to position the airbag 26 with the cavity 28 at the occupant-seating area 24. The assembly 10 includes a computer 34 including a processor and a memory storing instructions executable by the processor to detect a removable child-restraint system (CRS) 30 on the occupant-seating area 24 and, based on detection of a removable child-restraint system 30 on the occupant-seating area 24, inflate the airbag 26 to the inflated position in response to certain vehicle impacts.

In the event of detection of certain vehicle impacts and detection of the presence of a removable CRS 30 on the occupant-seating area 24, the airbag 26 is inflated to the inflated position and the pyrotechnic retractor 32 position the airbag 26 to position the cavity 28 at the occupant-seating area 24. The airbag 26 is in the uninflated position during operation of the vehicle 12 and the airbag 26 inflates to the inflated position in the event of certain vehicle impacts. When the airbag 26 is in the inflated position and when the cavity 28 is positioned at the occupant-seating area 24, the airbag 26 controls the kinematics of the removable CRS 30 and/or an occupant of the removable CRS 30.

Figure 4:
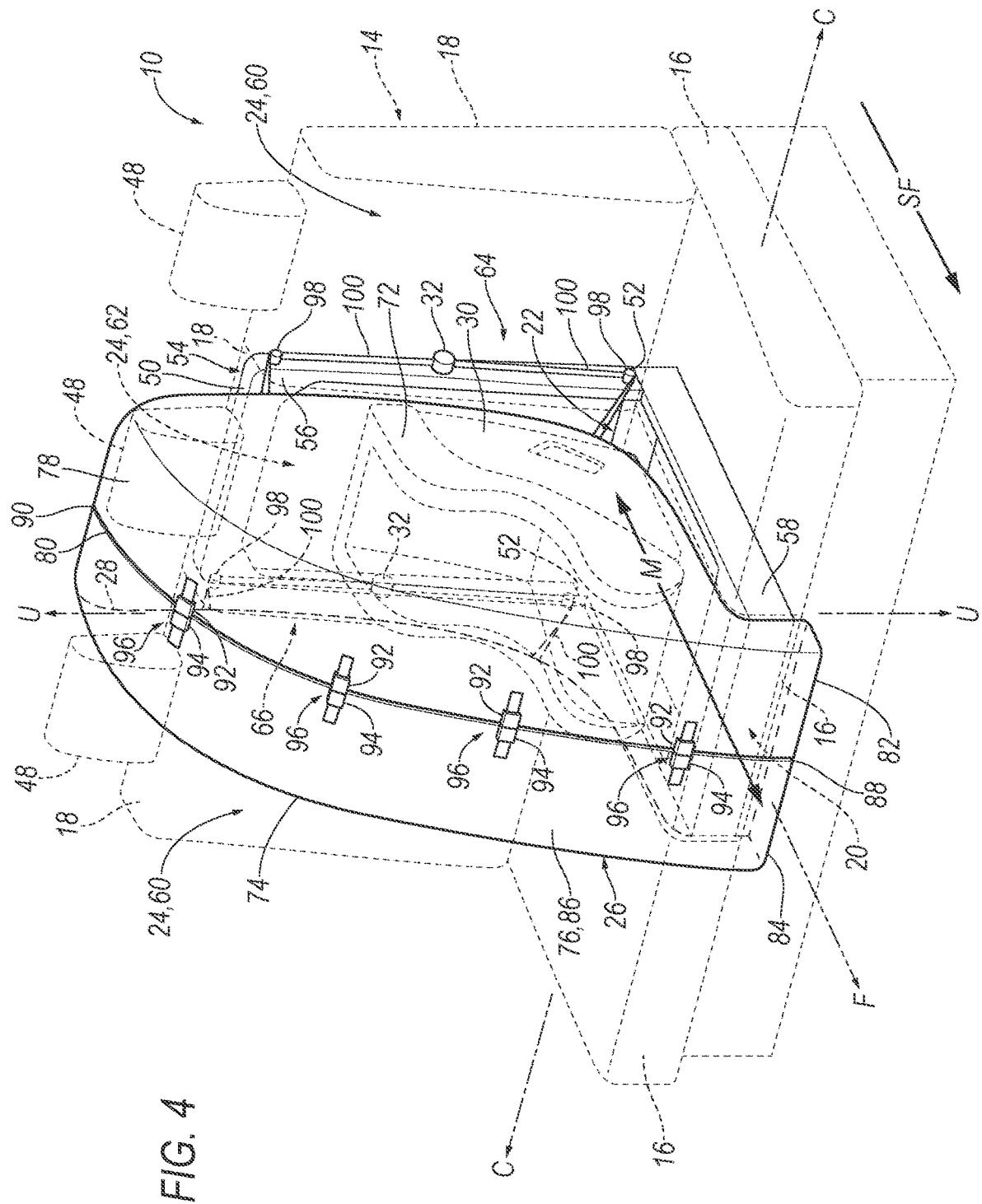
FIG. 4 is a perspective view of a first example of the airbag in the inflated position and tethers in a retraced position.
Figure 5:
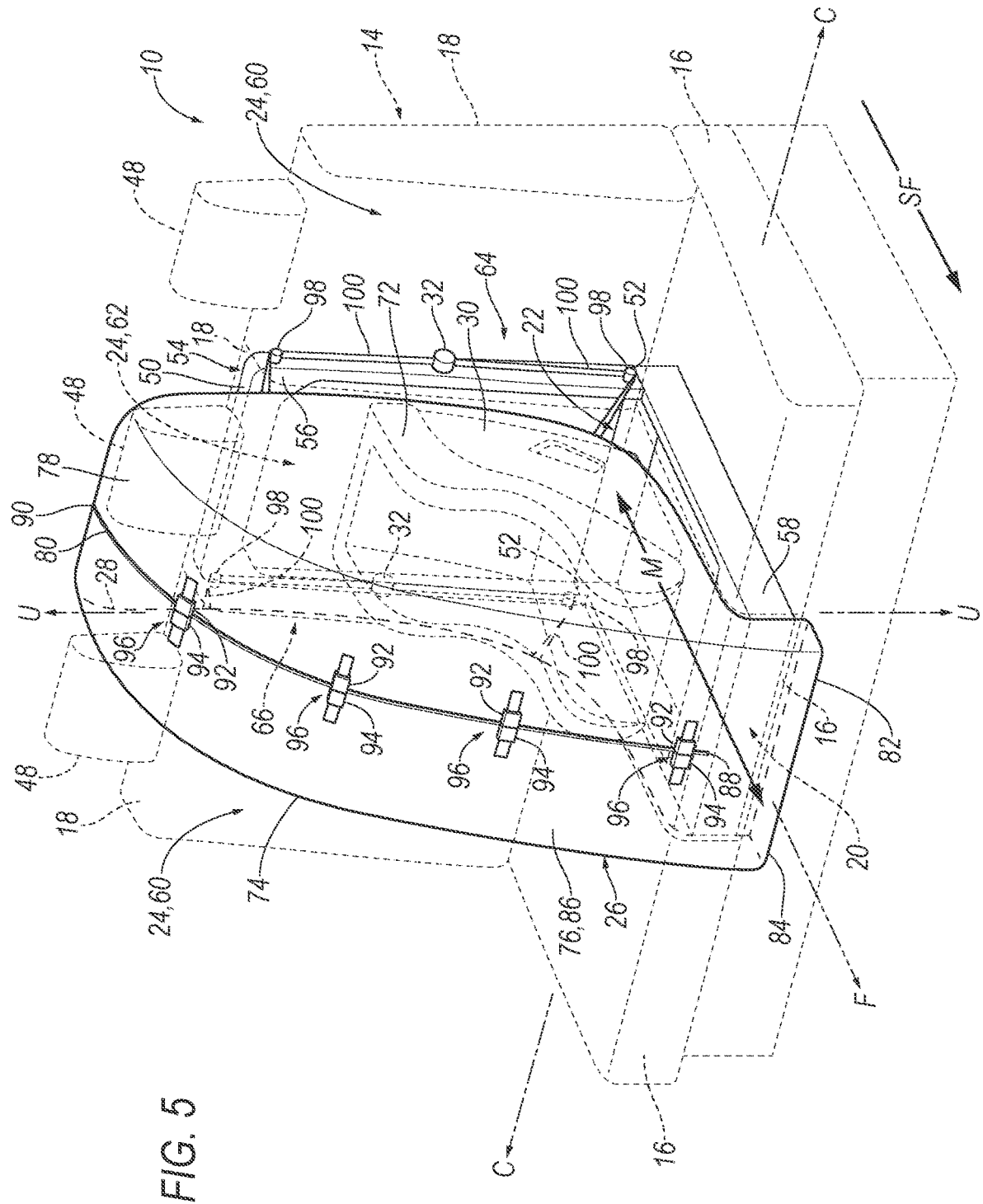
FIG. 5 is a perspective view of a second example of the airbag in the inflated position and tethers in a retracted position.

Two examples of the airbag 26 are shown in the Figures and common numerals are used to identify common features in the examples. A first example of the airbag 26 is shown in FIG. 4. In such an example, a gap 80 between a first inflation chamber 82 of the airbag 26 and the second inflation extends from the seat bottom 16 to the seatback 18. A second example of the airbag 26 is shown in FIG. 5. In such an example, a gap 80 between a first inflation chamber 82 of the airbag 26 and a second inflation chamber 84 is spaced upwardly from the seat bottom 16 and extends to the seatback 18.

With reference to FIG. 1, the vehicle 12 may be any suitable type of ground vehicle, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

The vehicle 12 defines a vehicle-longitudinal axis L extending between a front vehicle end (not numbered) and a rear vehicle end (not numbered) of the vehicle 12. The vehicle 12 defines a cross-vehicle axis A extending cross-vehicle from one side to the other side of the vehicle 12. The vehicle-longitudinal axis L and the cross-vehicle axis A are perpendicular relative to each other.

The vehicle 12 includes a vehicle body 36 defining a passenger compartment 38 to house occupants of the vehicle 12. The vehicle body 36 includes a vehicle roof 40 and a vehicle floor 42 with the vehicle roof 40 defining an upper boundary of the passenger compartment 38 and the vehicle floor 42 defining a lower boundary of the passenger compartment 38. The vehicle body 36 includes vehicle doors openable to allow ingress to and egress from the passenger compartment 38. The passenger compartment 38 may extend across the vehicle 12, i.e., from one side to the other side of the vehicle 12. The passenger compartment 38 includes a front end (not numbered) and a rear end (not numbered) from the front end being in front of the rear end along the vehicle-longitudinal axis L during forward movement of the vehicle 12.

The vehicle 12 includes one or more vehicle seats 14. Specifically, the vehicle 12 may include any suitable number of vehicle seats 14. The vehicle seats 14 are supported by the vehicle floor 42. The vehicle seats 14 may be arranged in any suitable arrangement in the passenger compartment 38. One or more of the vehicle seats 14 may be at the front end of the passenger compartment 38, e.g., in a front row 44. One or more of the vehicle seats 14 may be behind the front end of the passenger compartment 38, e.g., at the rear end of the passenger compartment 38 as a rear row 46. In the example shown in the Figures, the vehicle 12 includes the vehicle seat 14 arranged as a rear row 46. The rear row 46 may be, in some examples, a second row or a third row. The vehicle seats 14 may be of any suitable type, e.g., a bucket seat, bench seat, etc.

Each of the vehicle seats 14 include the seat bottom 16 and the seatback 18 supported by the seat bottom 16. The vehicle seat 14 may include a head restraint 48. The head restraint 48 may be supported by and extend upwardly from the seatback 18. The head restraint 48 may be stationary or movable relative to the seatback 18. The seatback 18 may be supported by the seat bottom 16 and may be stationary or movable relative to the seat bottom 16. The seatback 18 may extend from an upper end 50 to a lower end 52. The lower end 52 may be connected to the seat bottom 16. The upper end 50 of the seatback 18 may be spaced upwardly from the lower end 52 of the seatback 18, i.e., upwardly from the seat bottom 16. The head restraint 48 may extend upwardly from the upper end 50 of the seatback 18. The seatback 18, the seat bottom 16, and the head restraint 48 may be adjustable in multiple degrees of freedom relative to each other.

With continued reference to FIG. 1, each vehicle seat 14 defines a seat-forward direction SF along a seat-forward axis F. The seat bottom 16 includes the seat-forward end 20 and the seat-rearward end 22 spaced from the seat-forward end 20 along the seat-forward axis F. The seat-forward direction SF1 extends forward relative to the vehicle seat 14. For example, the seat-forward direction SF1 may extend from seat-rearward end 22 of the seat bottom 16 to the seat-forward end 20 of the seat bottom 16 relative to an occupant of the vehicle seat 14, i.e., the occupant of the vehicle seat 14 faces in the seat-forward direction SF1. Specifically, the seat bottom 16 extends from the seatback 18 in the seat-forward direction SF1 to the seat-forward end 20. In other words, the seatback 18 is supported at the seat-rearward end 22 of the seatback 18.

Figure 2:
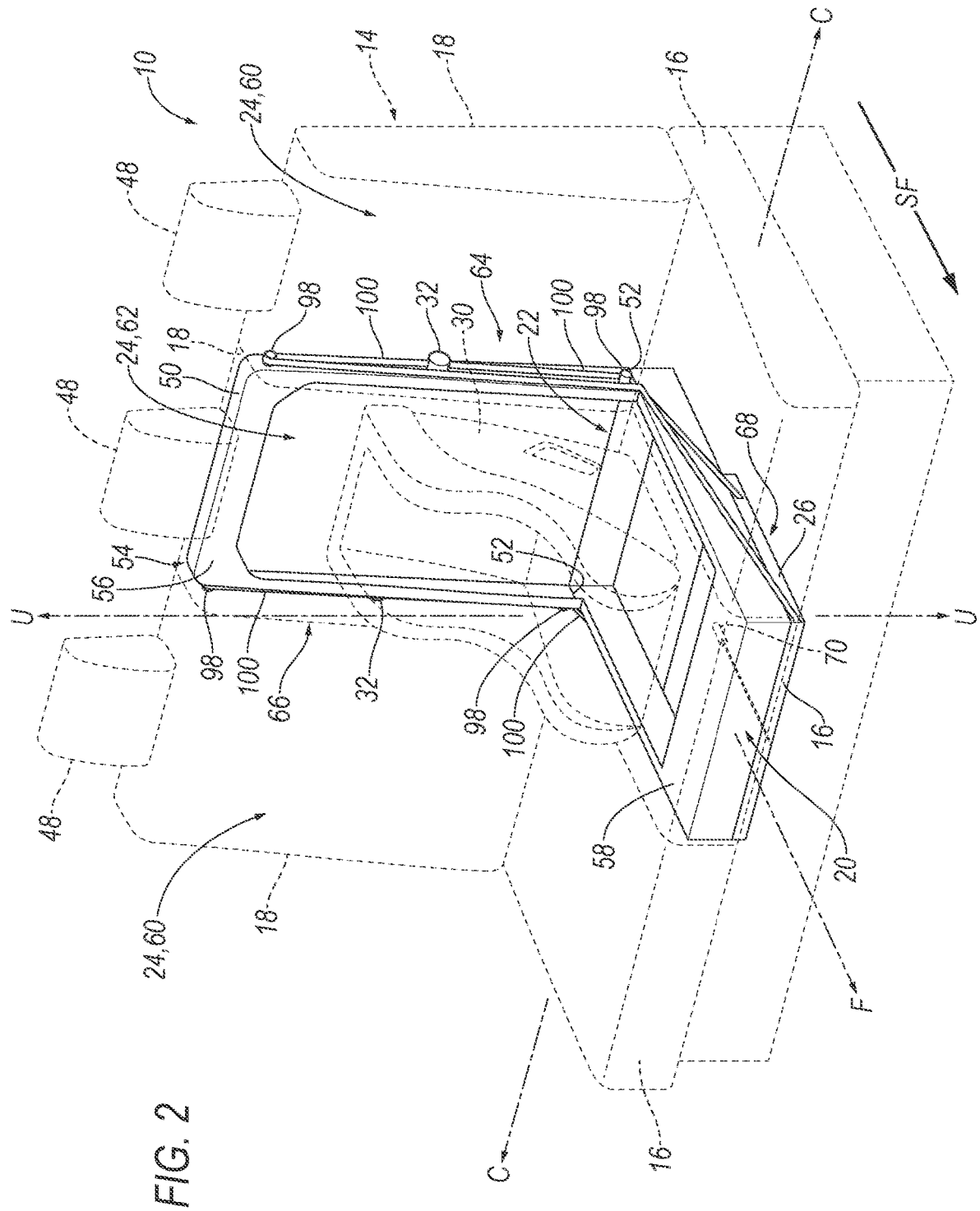
FIG. 2 is a perspective view of the vehicle seat with a CRS installed on the vehicle seat with an airbag assembly below the vehicle seat.

With reference to FIG. 2, the vehicle seat 14 includes a seat frame 54. The seat frame 54 includes a seatback frame 56 and a seat bottom frame 58, i.e., the seatback 18 includes the seatback frame 56 and the seat bottom 16 includes the seat bottom frame 58. The seat frame 54 may include panels and/or may include tubes, beams, etc. The seat frame 54 may be of any suitable plastic material (e.g., carbon fiber reinforced plastic (CFRP), glass fiber-reinforced semi-finished thermoplastic composite (organosheet), etc.), a suitable metal (e.g., steel, aluminum, etc.), etc. In the example shown in FIGS. 1-5, the vehicle seat 14 includes a pair of outboard portions 60 and a middle portion 62 between the outboard portions 60. The seat frame 54 of the middle portion 62 is shown in FIGS. 2-5. In other examples, such as at the outboard portions 60 of the vehicle seat 14, the vehicle seat 14 may include a seat frame 54 identical to the seat frame 54 shown in the middle portion 62.

The vehicle seat 14 includes a covering (not numbered) supported on the seat frame 54. The covering may be cloth, leather, faux leather, or any other suitable material. The vehicle seat 14 may include padding material between the covering and the seat frame 54. The padding material may be foam or any other suitable material. The cover may be stitched in panels around the seat frame 54 and padding material. The covering, e.g., along the seatback frame 56 and the seat bottom frame 58, may include a tear seam (not numbered) associated with the airbag 26 and tethers 100 as described further below. In other words, the covering on one side of the tear seam separates from the covering on the other side of the tear seam when the force is above the threshold magnitude. The threshold magnitude may be chosen to be greater than forces from, e.g., inadvertent pushing against the vehicle seat 14 by an occupant but be less than forces from the deployment of the airbag 26. The tear seam may be, for example, a line of perforations through the covering, a line of thinner covering material than the rest of the covering, etc.

The vehicle seat 14 defines a cross-seat axis C and a seat-upright axis U. The seat-forward axis F, the cross-seat axis C, and the seat-upright axis U are perpendicular to each other. In the example shown in the Figures, the vehicle seat 14 of the rear row 46 includes three occupant-seating areas 24 positioned along the cross-seat axis C. Specifically, the outboard portions 60 each include an occupant-seating area 24 and the middle portion 62 includes an occupant-seating area 24. In other examples, the vehicle seat 14 of the rear row 46 may include any suitable number of occupant-seating areas 24.

The vehicle seat 14 defines a first side 64 and a second side 66 spaced from the first side 64. Specifically, the first side 64 and the second side 66 are spaced from each along the cross-seat axis C. The first side 64 and the second side 66 define the seat-outboard limits of the vehicle seat 14. In other words, the first side 64 and the second side 66 extend along the entirety of the vehicle seat 14. Specifically, the first side 64 and the second side 66 each extend along the entire length of the seatback 18 and along the seat bottom 16. In other words, the first side 64 and the second side 66 each extends along the seat-upright axis U and the seat-forward axis F.

The seatback 18 and the seat bottom 16 may define at least one occupant-seating area 24. The occupant-seating area 24 is the space occupied by an occupant properly seated on the vehicle seat 14. The occupant-seating area 24 is seat-forward of the seatback 18 and above the seat bottom 16. As set forth above, in the example shown in the Figures, the vehicle seat 14 includes three occupant-seating areas 24. The three occupant-seating areas 24 are positioned adjacent each other along the cross-seat axis C. Each occupant-seating area 24 is designed to directly support an occupant and to alternatively support the removable CRS 30. In the example shown in FIGS. 1-5, the occupant-seating area 24 of the middle portion 62 supports the removable CRS 30.

Removable CRS s 30 are designed to control kinematics of a child, e.g., a human having a certain age, height, weight, etc., during certain vehicle impacts. The removable CRS 30 is configured for installation in the vehicle 12. When installed in the vehicle 12, the removable CRS 30 is supported by the vehicle seat 14. For example, the removable CRS 30 may sit atop the seat bottom 16 and abut the seatback 18. In other words, the removable CRS 30 is on the occupant-seating area 24 of the vehicle seat 14. As shown in the example in the Figures, the removable CRS 30 may be installed in a forward-facing orientation, i.e., in which the occupant of the removable CRS 30 faces a front of the vehicle 12. In other examples, the removable CRS 30 may be installed in a rearward-facing orientation, i.e., in which the occupant of the removable CRS 30 faces a rear of the vehicle 12.

A removable CRS 30 is designed to receive a child. The removable CRS 30 may include a seating portion having a bottom (not numbered) and a back (not numbered), e.g., for a child to sit on and recline against. The removable CRS 30 may include a base (not numbered) supporting the seating portion. The base may be below the bottom and/or behind the back of the removable CRS 30. The bottom and/or back may pivot relative to the base, e.g., to change an angle of the bottom and/or back of the removable CRS 30 relative to the vehicle seat 14 supporting the removable CRS 30. The bottom and/or the back may be upholstered, padded, etc. The base may be rigid relative to the bottom and/or the back. For example, the base may be of rigid material including material types such as plastic, metal, etc.

The removable CRS 30 may be configured to comply with a standard. As an example, the removable CRS 30 may be configured to comply with ISOFIX (e.g., ISO216), which is an international standard for attachment points for removable CRSs 30 in passenger vehicles. In addition or as other examples, the removable CRS 30 may be configured to comply with LATCH ("Lower anchors and Tethers for Children") in the United States, LUAS ("Lower Universal Anchorage System") or Canfix in Canada, and/or UCSSS ("Universal Child Safety Seat System").

The removable CRS 30 is removable from the vehicle seat 14. In other words, the removable CRS 30 may be installed to the vehicle seat 14 at one of the occupant-seat areas for use by an occupant of the removable CRS 30 and may be uninstalled from the vehicle seat 14 so that the occupant-seating area 24 is open for use by another occupant, e.g., an adult occupant. The vehicle 12 and the vehicle seat 14 are designed to connect to the removable CRS 30 to install the removable CRS 30 to the vehicle seat 14. As an example, the vehicle 12 includes the anchor that is designed to be connected to a removable CRS 30 when the removable CRS 30 is installed in the vehicle 12. Specifically, the removable CRS 30 includes a connection point that is connectable to the anchor to install the child restraint system. The connection point may be a clip, e.g., a clip with an open loop and flexible gate, an "alligator" style clip defining a slot with a button actuated latch, or any other suitable configuration for connecting to the respective anchor, including in some examples that are currently known. The connection point may be configured for attachment to the anchor that meets a standard, e.g., ISOFIX, LATCH, LUAS, UCSSS, etc. For example, a removable CRS 30 can have a strap and a clip that is connectable to the anchor. The removable CRS 30 may include further attachment points that connect to other features of the vehicle 12, e.g., other portions of the vehicle seat 14 or vehicle body 36 such as anchors meeting a standard, ISOFIX, LATCH, LUAS, UCSSS, etc., including in some examples those that are currently known.

With reference to FIGS. 2-5, the vehicle 12 may include one or more airbag assemblies 68. The airbag assembly 68 includes the airbag 26, one or more inflators 70, and may include a housing (not shown). The vehicle 12 may include any suitable number of airbag assemblies 68 and the airbag assemblies 68 may be positioned at any suitable position relative to the vehicle seat 14. As one example, as shown in the Figures, the airbag assembly 68 may be positioned at the seat-forward end 20 of the seat bottom 16 of the middle portion 62 of the vehicle seat 14. In other examples, the airbag assembly 68 may be positioned at the seat-forward end 20 of the seat bottom 16 of the outboard portions 60 of the vehicle seat 14. The vehicle 12 may include any suitable number and combination of airbag assembly 68 positions. For example, an airbag assembly 68 may be positioned at each portion of the vehicle seat 14, i.e., at the two outboard portions 60 and the middle portion 62. In other examples, an airbag assembly 68 may be positioned at only one of the portions of the vehicle seat 14. In examples including more than one airbag assembly 68, the airbag assemblies 68 may be identical or substantially identical to each other.

The airbag 26 is supported on the vehicle seat 14. Specifically, the airbag 26 is supported on the seat bottom 16 at the seat-forward end 20. In some examples, the airbag 26 may be fixed to the seat bottom frame 58 in the uninflated position. The airbag 26 may be between the seat bottom 16 and the vehicle floor 42 in the uninflated position. In such an example, the airbag 26 may be fixed to the vehicle floor 42 in the uninflated position. The airbag 26 may be fixed in any suitable way, e.g., fasteners, adhesive, etc.

In examples wherein a removable CRS 30 is installed in the vehicle 12 at a portion of the vehicle seat 14, the airbag 26 may inflate to the inflated position to receive the removable CRS 30 in the event of certain vehicle impacts. The airbag 26 is configured to receive a removable CRS 30 on the occupant-seating area 24 when the airbag 26 is in the inflated position. Specifically, the cavity 28 is configured to receive a removable CRS 30 on the occupant-seating area 24 when the airbag 26 is in the inflated position. In other words, the airbag 26 is shaped to define the cavity 28 that receives the removable CRS 30 in the inflated position, as described further below.

When the airbag 26 is in the inflated position, the removable CRS 30 is positioned in the cavity 28. When the removable CRS 30 is in the cavity 28, the airbag 26 is around the removable CRS 30. When the airbag 26 is in the inflated position, the cavity 28 is between the airbag 26 and the vehicle seat 14. The airbag 26 and the vehicle seat 14, specifically, the seatback 18 and the seat bottom 16, define the bounds of the cavity 28 around the removable CRS 30. Specifically, the airbag 26 and the vehicle seat 14 surround the cavity 28 when the airbag 26 is in the inflated position. The occupant-seating area 24, specifically a removable CRS 30 on the occupant-seating area 24, is surrounded by the airbag 26 and the vehicle seat 14 when the airbag 26 is in the inflated position. In other words, the airbag 26 and the vehicle seat 14 are on all sides of the occupant-seating area 24 and the removable CRS 30. Specifically, the airbag 26 and the vehicle seat 14 surround the occupant-seating area 24 and the removable CRS 30 in the inflated position. In other words, the airbag 26 may be between the removable CRS 30 and the remainder of the passenger compartment 38. The airbag 26 extends from the first side 64 of the vehicle seat 14 to the second side 66 of the vehicle seat 14. In examples wherein no removable CRS 30 is installed in the vehicle 12 at a portion of the vehicle seat 14, the airbag 26 remains in the uninflated position in the event of certain vehicle impacts.

In the inflated position, the occupant-seating area 24 is between the airbag 26 and the seatback 18 along the seat-forward axis F. In other words, in the inflated position, the removable CRS 30 on the occupant-seating area 24 is between the airbag 26 and the seatback 18 along the seat-forward axis F. In the inflated position, the occupant-seating area 24 is between the airbag 26 and the seat bottom 16 along the seat-upright axis U. In other words, the removable CRS 30 on the occupant-seating area 24 is between the airbag 26 and the seat bottom 16 along the seat-upright axis U.

With reference to FIGS. 4 and 5, the airbag 26 includes a plurality of portions 72, 74, 76, 78 to define the cavity 28. In other words, the airbag 26 includes a plurality of portions 72, 74, 76, 78 that define the bounds of the cavity 28, besides the seatback 18 and the seat bottom 16. Specifically, the airbag 26 includes a first side portion 72, a second side portion 74, a seat-forward portion 76, and a seat-upward portion 78 to the define the cavity 28. The first side portion 72 and the second side portion 74 are spaced from each other along the cross-seat axis C. The first side portion 72 and the second side portion 74 may each be along sides of the occupant-seating area 24 when the airbag 26 is in the inflated position. Specifically, the first side portion 72 is elongated along the first side 64 of the vehicle seat 14 and the second side portion 74 is elongated along the second side 66 of the vehicle seat 14. The first side portion 72 may abut the first side 64 of the vehicle seat 14 and the second side portion 74 may but the second side 66 of the vehicle seat 14. The first side portion 72 and the second side portion 74 extend upwardly from the seat bottom 16 along the seat-upright direction. The first side portion 72 and the second side portion 74 extend seat-forwardly along the seat-forward axis F.

The occupant-seating area 24 is between the first side portion 72 and the second side portion 74 along the cross-seat axis C. The removable CRS 30 on the occupant-seating area 24 is between the first side portion 72 and the second side portion 74 along the cross-seat axis C. In other words, the first side portion 72 and the second side portion 74 may extend along the sides, e.g., the right and left, of the removable CRS 30 when the airbag 26 is in the inflated position.

The seat-forward portion 76 is spaced seat-forward from the seatback 18 along the seat-forward axis F. In the inflated position, the seat-forward portion 76 is seat-forward of the removable CRS 30. The occupant-seating area 24 is between the seat-forward portion 76 and the seatback 18 along the seat-forward axis F. In the inflated position, the removable CRS 30 is between the seat-forward portion 76 and the seatback 18 along the seat-forward axis F. The seat-forward portion 76 extends from the first side portion 72 to the second side portion 74 along the cross-seat axis C. In other words, in some examples, the seat-forward portion 76 may connect the first side portion 72 to the second side portion 74 along the seat-forward end 20 of the seat bottom 16. In other examples, such as shown in the examples of the Figures, the seat-forward portion 76 may be separated into multiple portions by a gap 80, as described further below. The seat-forward portion 76 extends upwardly along the first side portion 72 and the second side portion 74 away from the seat bottom 16. Specifically, the seat-forward portion 76 extends upwardly around the occupant-seating area 24 from the seat bottom 16.

The seat-upward portion 78 is spaced upwardly from the seat bottom 16. In other words, the occupant-seating area 24 is between the seat-upward portion 78 and the seat bottom 16 along the seat-upright axis U. The seat-upward portion 78 is between the occupant-seating area 24 and the vehicle roof 40. In other words, the seat-upward portion 78 of the airbag 26 is above the removable CRS 30 when the airbag 26 is in the inflated position. The seat-upward portion 78 extends from the seatback 18 to the seat-forward portion 76 in the seat-forward-direction. The seat-upward portion 78 extends from the first side portion 72 to the second side portion 74 along the cross-seat axis C. In some examples, the seat-upward portion 78 may connect the first side portion 72 to the second side portion 74. In other examples, such as shown in the examples of the Figures, the seat-upward portion 78 may be separated into multiple portions by a gap 80, as described further below.

Figure 3:
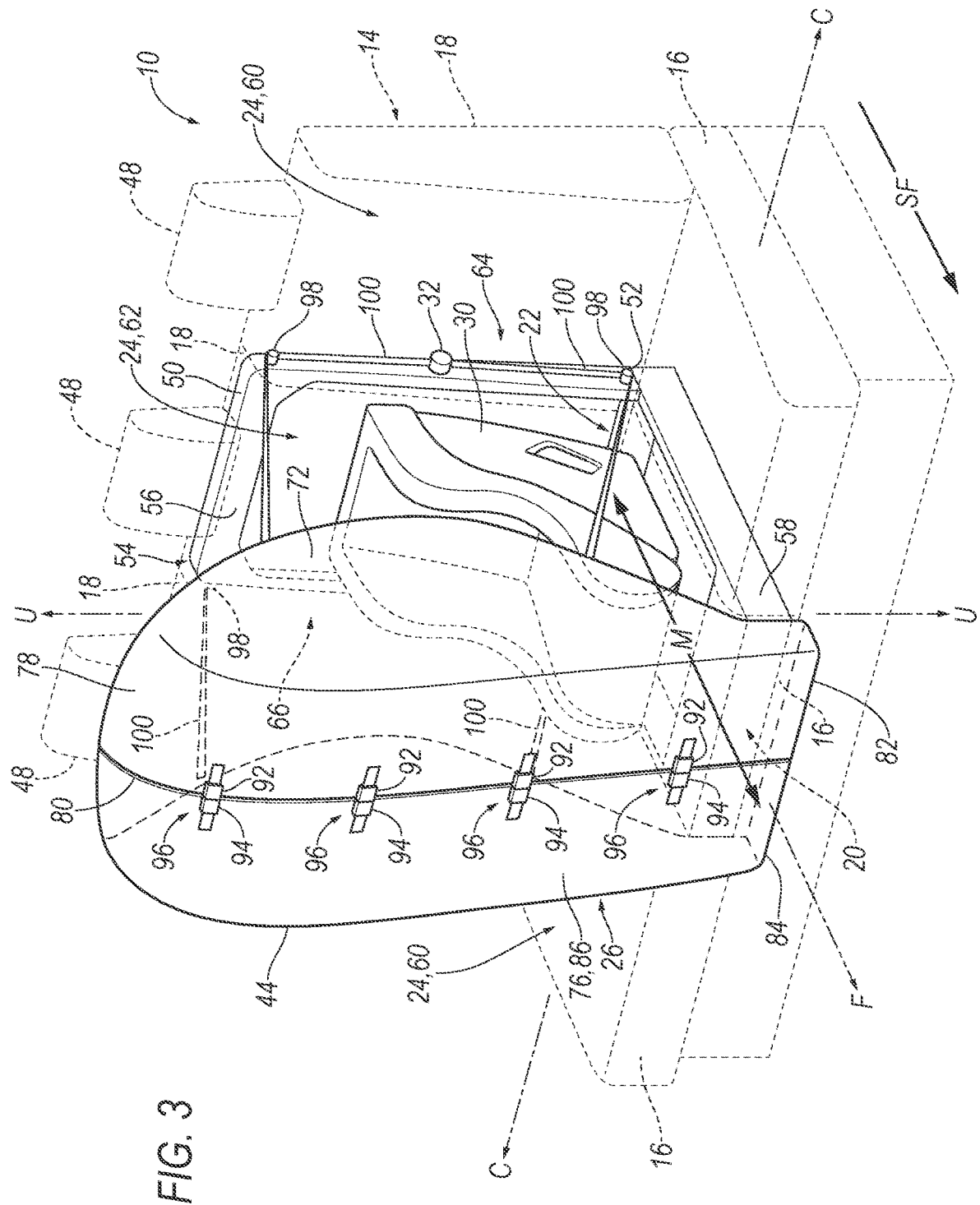
FIG. 3 is a perspective view of the vehicle seat with a CRS installed on the vehicle seat with an airbag of the airbag assembly move to an inflated position and tethers in a non-retracted positions.

The airbag 26 may be separated into multiple inflation chambers 82, 84. For example, the airbag 26 may include a first inflation chamber 82 and a second inflation chamber 84 as shown in FIGS. 3-5. The first inflation chamber 82 and the second inflation chamber 84 are each inflatable from the uninflated position to the inflated position. In the inflated position, the first inflation chamber 82 and the second inflation chamber 84 each extend upwardly from the seat bottom 16 and toward the seatback 18. Both the first inflation chamber 82 and the second inflation chamber 84 inflate to the inflated position simultaneously, i.e., at the same time. The first inflation chamber 82 may extend to one side of the vehicle seat 14 and the second inflation chamber 84 extends to the other side of the vehicle seat 14. Specifically, the first inflation chamber 82 extends to the first side 64 of the vehicle seat 14 and the second inflation chamber 84 extends to the second side 66 of the vehicle seat 14. The inflation chambers 82, 84 extend around the occupant-seating area 24 from the first side 64 to the second side 66. Specifically, the inflation chambers 82, 84 may be elongated in a round path from the first side 64 of the vehicle seat 14 to the second side 66 of the vehicle seat 14. The inflation chambers 82, 84 may extend in a rounded path from the first side 64 to the second side 66 around the occupant-seating area 24, and, in turn, the removable CRS 30. The first inflation chamber 82 and the second inflation chamber 84 encloses the occupant-seating area 24 between the inflation chambers 82, 84 and the seatback 18 in the inflated position. The inflation chambers 82, 84 control the kinematics of the removable CRS 30 on the occupant-seating area 24 and may separate removable CRS 30 from other vehicle occupants in the vehicle 12 in the event of certain vehicle impacts.

The first inflation chamber 82 and the second inflation chamber 84 extend from the bolsters the sides of the vehicle seat 14 and converge to a gap 80. FIGS. 3 and 4 show a first example of the gap 80 between the inflation chambers 82, 84 and FIG. 5 show a second example of the gap 80 between the inflation chambers 82, 84.

The gap 80 may extend along a midline M of the vehicle seat 14, i.e., along the middle of the vehicle seat 14. The gap 80 may include a first end 88 and a second end 90. The second end 90 is adjacent the seatback 18 of the vehicle seat 14. In the example shown in FIGS. 3 and 4, the first end 88 of the gap 80 is adjacent the seat bottom 16 and the second end 90 is adjacent the seatback 18. In such an example, the gap 80 extends from the seat bottom 16 to the seatback 18. In the example shown in FIG. 5, the first end 88 of the gap 80 is spaced upwardly along the airbag 26 from the seat bottom 16 and the seatback 18 is adjacent the seatback 18. In such an example, the first inflation chamber 82 and the second chamber may be connected to each other at the seat-forward end 20 of the seat bottom 16.

In both examples shown in the Figures, the first inflation chamber 82 and the second inflation chamber 84 may abut each other at the gap 80. In other examples, the first inflation chamber 82 and the second inflation chamber 84 may be spaced from each other along part of or all of the gap 80. The first inflation chamber 82 and the second inflation chamber 84 each extend from the first side 64 to the second side 66 and converge to the gap 80. The seat-forward portion 76 and the seat-upward portion 78 may be separated by the gap 80. In other words, each of the first inflation chamber 82 and the second inflation chamber 84 may include a part of the seat-forward portion 76 and the seat-upward portion 78.

The first inflation chamber 82 and the second inflation chamber 84 each include an outer panel 86 and an inner panel (not numbered). In the inflated position, the outer panels 86 of each of the inflation chambers 82, 84 face toward the passenger compartment 38 and the inner panels face toward the vehicle seat 14. In other words, the inner panels are between the outer panels 86 and the vehicle seat 14. Specifically, the inner panel faces toward the occupant-seating area 24 and the removable CRS 30 on the occupant-seating area 24. The outer panels 86 and the inner panels may extend from the seatback 18, specifically, the first side 64 and the second side 66 of the vehicle seat 14, to the gap 80 between the first inflation chamber 82 and the second inflation chamber 84. In the event of certain vehicle impacts, the removable CRS 30 may contact the inner panel and the first inflation chamber 82 and the second inflation chamber 84 may control the kinematics of the removable CRS 30.

In both examples shown in the Figures, the inflation chambers 82, 84 may be releasably connectable to each other at the gap 80. In other words, the first inflation chamber 82 may be releasably connectable to the second inflation chamber 84 at the gap 80. The assembly 10 includes a buckle 92 and a clip 94. The clip 94 is releasably connectable to the buckle 92. The clip 94 is releasably connected to the buckle 92 when the airbag 26 is in the inflated position. In other words, the clip 94 may be releasable from the buckle 92. The clip 94 is releasably engageable with the buckle 92. The buckle 92 and the clip 94 may be of any suitable design so that the occupant can selectively engage and disengage the clip 94 and the buckle 92, including designs that are currently known. As one example, the buckle 92 may include a spring-loaded button that releasably engages a hole in the clip 94. In such an example, the buckle 92 and the clip 94 may be of the type or similar to the type conventionally used in seatbelt assemblies. As another example, the buckle 92 may be a side-release buckle 92 having resilient tabs that releasably engage slots in the clip 94.

With reference to FIGS. 3-5, the assembly 10 may include a plurality of buckles 92 and clips 94 arranged in pairs 96, i.e., each pair 96 having one buckle 92 and one clip 94. In examples including a plurality of pairs 96 of buckles 92 and clips 94, the types of buckles 92 and clips 94 may vary based on the location of the pair 96 of buckle 92 and clip 94. The assembly 10 may include any suitable number of pairs 96 of buckles 92 and clips 94. For example, in both examples shown in the Figures, the assembly 10 includes four pairs 96 of buckles 92 and clips 94. The buckles 92 are sized to be packaged in the seatback 18. As an example, the buckles 92 may be about ½-1 inch thick.

In each pair 96 of buckle 92 and clip 94, the buckle 92 is fixed to one of the first inflation chamber 82 and the second inflation chamber 84 and the clip 94 is fixed to the other of the first inflation chamber 82 and the second inflation chamber 84. In other words, when the buckle 92 is fixed to the first inflation chamber 82, the clip 94 is fixed to the second inflation chamber 84 and when the buckle 92 is fixed to the second inflation chamber 84, the clip 94 is fixed to the first inflation chamber 82.

When the buckles 92 and the clips 94 are releasably connected, the buckles 92 and the clips 94 extend across the gap 80 between the first inflation chamber 82 and the second inflation chamber 84. The buckles 92 and clips 94 maintain the gap 80 between first inflation chamber 82 and the second inflation chamber 84 in the inflated position. In other words, the first inflation chamber 82 and the second inflation chamber 84 are connected to each other by the buckles 92 and the clips 94. In the event of certain vehicle impacts, wherein the first inflation chamber 82 and the second inflation chamber 84 inflate to the inflated position and upon completion of certain vehicle impacts, the clips 94 may be released from the buckles 92 to separate the first inflation chamber 82 from the second inflation chamber 84 to allow access to the removable CRS 30.

In some examples, the buckle 92 may be fixed to the outer panels 86 of one of the first inflation chamber 82 and the second inflation chamber 84 and the clip 94 may be fixed to the outer panel 86 of the other of the first inflation chamber 82 and the second inflation chamber 84. In such an example, the buckle 92 and clip 94 face upwardly from the inflation chambers 82, 84 toward the passenger compartment 38, and away from the occupant-seating area 24 of the vehicle seat 14.

One or more inflators 70 is in fluid communication with the airbag 26. In the examples shown in the Figures, one inflator 70 is fixed relative to the seat bottom 16, e.g., the seat bottom frame 58, and the inflator 70 is in fluid communication with the first inflation chamber 82 and the second inflation chamber 84. In other examples, more than one inflator 70, e.g., two inflators 70 may be in fluid communication with the first inflation chamber 82 and the second inflation chamber 84. The inflator 70 expands the airbag 26 with inflation medium, such as a gas, to move the airbag 26 from the uninflated position to the inflated position. The inflator 70 may be supported by any suitable component. For example, the inflator 70 may be fixed to the seat bottom 16, e.g., the seat bottom frame 58. The inflator 70 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 70 may be, for example, at least partially in the inflation chambers 82, 84 of the airbag 26 to deliver inflation medium directly to the inflation chambers 82, 84 or may be connected to the inflation chambers 82, 84 through fill tubes, diffusers, etc.

The airbag 26 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

As shown in FIGS. 2-5, the vehicle 12 may include one or more pyrotechnic retractors 32 supported by the vehicle seat 14. Specifically, the vehicle 12 may include one or more pyrotechnic retractors 32 fixed to the vehicle seat 14. As shown in the examples in the Figures, the vehicle 12 includes two pyrotechnic retractors 32. One pyrotechnic retractor 32 is supported by the first side 64 of the vehicle seat 14 and one pyrotechnic retractor 32 is supported by the second side 66 of the vehicle seat 14. Specifically, one pyrotechnic retractor 32 is fixed to the first side 64 of the vehicle seat 14 and one pyrotechnic retractor 32 is fixed to the second side 66 of the vehicle seat 14. The pyrotechnic retractors 32 may be supported by the seatback 18 of the vehicle seat 14, e.g., the seatback frame 56. Specifically, one pyrotechnic retractor 32 may be fixed to the first side 64 of the seatback 18 and the other pyrotechnic retractor 32 is fixed to the second side 66 of the seatback 18. In other words, the pyrotechnic retractors 32 are spaced from each other along the cross-seat axis C. In other examples, the pyrotechnic retractors 32 may be fixed at any suitable location on the vehicle seat 14. In the example shown in the Figures, the pyrotechnic retractors 32 may be spaced equidistantly from the upper end 50 and the lower end 52 of the seatback 18 along the seat-upright axis U. The vehicle seat 14 may include any number of pyrotechnic retractors 32 suitable to move the airbag 26 toward the seatback 18.

The pyrotechnic retractors 32 are connected to the airbag 26. Specifically, the pyrotechnic retractors 32 may be connected to one or more locations of the airbag 26. The pyrotechnic retractors 32 are operatively coupled to the airbag 26 to position the airbag 26 with the cavity 28 at the occupant-seating area 24. In other words, when the airbag 26 moves to the inflated position, the pyrotechnic retractors 32 are connected to the airbag 26 in such a way that the pyrotechnic retractors 32 activate to position the cavity 28 at the occupant-seating area 24. The pyrotechnic retractors 32 move the airbag 26 toward the seatback 18 so that the airbag 26 surrounds a removable CRS 30 and the cavity 28 is positioned at the removable CRS 30. The pyrotechnic retractors 32 may be lockable relative to the seatback 18. Specifically, when the cavity 28 is positioned at the occupant-seating area 24, the pyrotechnic retractors 32 lock to maintain the cavity 28 at the occupant-seating area 24 and around the removable CRS 30. In the event of certain vehicle impacts, the pyrotechnic retractors 32 moves the airbag 26 toward the seatback 18 as the airbag 26 moves to the inflated position. The pyrotechnic retractor 32 pulls airbag 26 toward the seatback 18 to surround the occupant-seating area 24 of the vehicle seat 14 and the pyrotechnic retractor 32 locks to maintain the cavity 28 at the occupant-seating area 24.

With reference to FIGS. 3-5, the assembly 10 includes one or more tethers 100 extending from the pyrotechnic retractor 32 to the airbag 26. Specifically, in the example shown in the Figures, the assembly 10 includes four tethers 100 with two tethers 100 extending from the airbag 26 to the first pyrotechnic retractor 32 and two tethers 100 extending from airbag 26 to the second pyrotechnic retractor 32. The pyrotechnic retractors 32 are operatively coupled to the tethers 100 to position the airbag 26 with the cavity 28 at the occupant-seating area 24. In other words, the tethers 100 may be retractably coupled to the pyrotechnic retractor 32 to move tethers 100 from a non-retracted position to a retracted position. The tethers 100 are in the retracted position when the airbag 26 is in the inflated position. In the event of an impact to the vehicle 12, the pyrotechnic retractor 32 may retract the tethers 100 toward the seatback 18 to move the airbag 26 toward the seatback 18. Retracting the tethers 100 moves the cavity 28 of the airbag 26 to position the airbag 26 at the occupant-seating area 24 around a removable CRS 30. Once the tethers 100 are in the retracted position, the pyrotechnic retractors 32 are lockable to maintain the cavity 28 at the occupant-seating area 24. In other words, the pyrotechnic retractors 32 are lockable to maintain the tethers 100 in the retracted position.

As discussed above, the assembly 10 may include four tethers 100. In the example shown in the Figures, the assembly 10 includes two tethers 100 on the first side 64 of the vehicle seat 14 and two tethers 100 on the second side 66 of the vehicle seat 14. The two tethers 100 on the first side 64 extend from the first pyrotechnic retractor 32 to the airbag 26. One tether 100 may be connected to the airbag 26 at a position near the upper end 50 of the seatback 18 when the airbag 26 is in the inflated position and the other of the tethers 100 may be connected to the airbag 26 at a position spaced downwardly from the other tether 100. Specifically, the tethers 100 may be spaced downwardly from the upper end 50 of the seatback 18. In other words, the tethers 100 are spaced from each other along the seat-upright axis U on the first side 64 of the vehicle seat 14.

The two tethers 100 on the second side 66 extend from the second pyrotechnic retractor 32 to the airbag 26. In other words, the two tethers 100 on the second side 66 are spaced cross-seat from the tethers 100 on the first side 64. One tether 100 may be connected to the airbag 26 at a position near the upper end 50 of the seatback 18 when the airbag 26 is in the inflated position and the other of the tethers 100 may be connected to the airbag 26 at a position spaced downwardly from the other tether 100. In other words, the tethers 100 are spaced from each other along the seat-upright axis U on the second side 66 of the vehicle seat 14.

A plurality of pegs 98 may be fixed relative to the seatback 18 to route the tethers 100 from the airbags 26 to the pyrotechnic retractors 32. As the tethers 100 move to the retracted position, the pegs 98 maintain the position of the airbag 26 as the airbag 26 is moved toward the seatback 18. A peg 98 may be fixed to the seatback frame 56 on the first side 64 of the vehicle seat 14 adjacent the upper end 50, a peg 98 may be fixed to the seatback frame 56 on the second side 66 of the vehicle seat 14 adjacent the upper end 50, a peg 98 may be fixed to the seatback frame 56 on the first side 64 of the vehicle seat 14 spaced downwardly from the upper end 50, and a peg 98 may be fixed to the seatback frame 56 on the second side 66 of the vehicle seat 14 spaced downwardly from the upper end 50. The tethers 100 adjacent the upper end 50 of the seatback 18 are routed from the airbag 26, around the pegs 98 adjacent the upper end 50 and downwardly along the seatback frame 56 to the pyrotechnic retractor 32. The tethers 100 spaced downwardly from the upper end 50 of the seatback 18 are routed from the airbag 26, around the pegs 98 spaced downwardly from the upper end 50 and upwardly along the seatback frame 56 to the pyrotechnic retractor 32. The tethers 100 may slide along the pegs 98 as the tethers 100 are moved to the retracted positions.

The tethers 100 may be concealed by the upholstery of the vehicle seat 14 when the airbag 26 is in the uninflated position. As shown in FIG. 2, the tethers 100 may be routed around the pegs 98 and along the seatback frame 56 and the seat bottom frame 58 when the airbag 26 is in the uninflated position. The upholstery may be releasable along the tethers 100 and adjacent the pyrotechnic retractors 32. Specifically, the upholstery may include a tear seam (not shown) aligned with the tethers 100. The tethers 100 and the tear seam are positioned such that the tethers 100 breaks through the tear seam as the pyrotechnic retractors 32 retracts the tethers 100.

The pyrotechnic retractors 32 include a pyrotechnic charge that activate the pyrotechnic retractors 32 to move the airbag 26 toward the seatback 18 to the inflated position. The pyrotechnic charge may be combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

The pyrotechnic retractor 32 may be any suitable type such as a rotary actuator, in which the pyrotechnic charge rotates a shaft connected to the tether 100 such that the tether 100 wraps around the shaft; a piston linkage, in which the pyrotechnic charge for example, drives a piston attached to the tether 100; a ball-in-tube linkage, in which an pyrotechnic charge propels a ball or balls over a cogwheel connected to the tether 100; a mechanical linkage, in which a compressed spring attached to the tether 100 is released; or any other suitable type.

In the event of certain vehicle impacts, the airbag 26 inflates to the inflated position. As the airbag 26 inflates to the inflated position, the pyrotechnic retractors 32 are activated. The pyrotechnic retractors 32 move the tethers 100 to the retracted position. As the tethers 100 are retracted to the retracted position, the cavity 28 of the airbag 26 is positioned at the occupant-seating area 24 and the airbag 26 surrounds the removable CRS 30 on the occupant-seating area 24.

Figure 6:
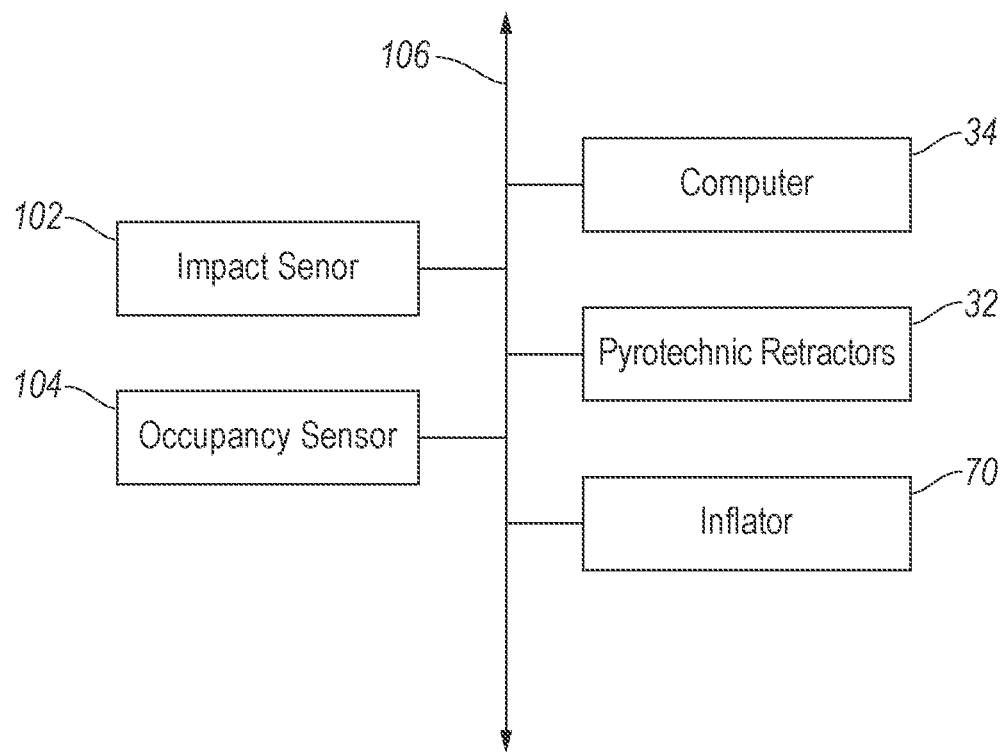
FIG. 6 is a block diagram of a vehicle communication system of the vehicle.

With reference to FIG. 6, the vehicle 12 includes the computer 34 which includes a processor and a memory. The computer 34 may be a restraints control module. The memory includes one or more forms of computer readable media, and stores instructions executable by the computer 34 for performing various operations, including as disclosed herein and including, for example, method 700 shown in FIG. 7 and described below. For example, the computer 34 may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 34 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 34. The memory may be of any type, e.g., hard disk drives, solid state drives, servers, or any volatile or non-volatile media. The memory may store the collected data sent from the sensors. The memory may be a separate device from the computer 34, and the computer 34 may retrieve information stored by the memory via a vehicle communication network 106, e.g., over a CAN bus, a wireless network, etc. Alternatively or additionally, the memory may be part of the computer 34, e.g., as a memory of the computer 34.

As shown in FIG. 6, the computer 34 is generally arranged for communications on the vehicle communication network 106 that may include a bus in the vehicle 12 such as a controller area network CAN or the like, and/or other wired and/or wireless mechanisms. Alternatively or additionally, in cases where the computer 34 includes a plurality of devices, the vehicle communication network 106 may be used for communications between devices represented as the computer 34 in this disclosure. Further, as mentioned below, various controllers and/or sensors may provide data to the computer 34 via the vehicle communication network 106.

The vehicle 12 may include at least one impact sensor 102 for sensing certain vehicle impacts (e.g., impacts of a certain magnitude, direction, etc.), and the computer 34 in communication with the impact sensor 102 and the inflator 70. The computer 34 may activate the inflator 70, e.g., provide an impulse to a pyrotechnic charge of the inflator 70 when the impact sensor 102 senses certain vehicle impacts. The impact sensor 102 may be configured to sense certain vehicle impacts prior to impact, i.e., pre-impact sensing. The impact sensor 102 may be in communication with the computer 34. The impact sensor 102 is configured to detect certain vehicle impacts. In other words, a "certain vehicle impact" is an impact of the type and/or magnitude for which inflation of the airbag 26 is designed i.e., "certain" indicates the type and/or magnitude of the impact. The type and/or magnitude of such "certain vehicle impacts" may be pre-stored in the computer 34, e.g., a restraints control module and/or a body control module. The impact sensor 102 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 102 may be located at numerous points in or on the vehicle 12.

The vehicle 12 may include at least one occupancy sensor 104. The occupancy sensor 104 configured to detect occupancy of the vehicle seats 14, e.g., detect an occupant in the occupant-seating area. Specifically, the occupancy sensor 104 may detect occupancy of the vehicle seat 14 by a removable CRS 30 and/or an occupant seated directly on the vehicle seat 14, e.g., and adult occupant. If a removable CRS 30 is detected, the airbag 26 remains in the uninflated position. The occupancy sensor 104 may be visible-light or infrared cameras directed at the vehicle seat 14, weight sensors supported by the seat bottom 16, sensors detecting whether a seatbelt assembly (not shown) for the vehicle seat 14 is buckled, or other suitable sensors. The occupancy sensor 104 provides data to the computer 34 specifying whether the vehicle seat 14 is occupied or unoccupied and information regarding the type of occupant. As one example, the vehicle 12 may include one occupancy sensor 104 for each occupant-seating area. As another example, the vehicle 12 may include one occupancy sensor 104 that is designed to individually detect occupancy of each occupant-seating area.

The occupancy sensor 104 is designed to detect data identifying the type of occupancy, e.g., a CRS 30 on the occupant-seating area, an adult occupant directly seated on the occupant-seating area, etc. In some examples, the occupancy sensor 104 may determine the type of occupant, a CRS 30 on the occupant-seating area, an adult occupant directly seated on the occupant-seating area, etc. In other examples, the occupancy sensor 104 may communicate data to the computer 34 for use by the computer 34 to identify the type of occupant.

Figure 7:
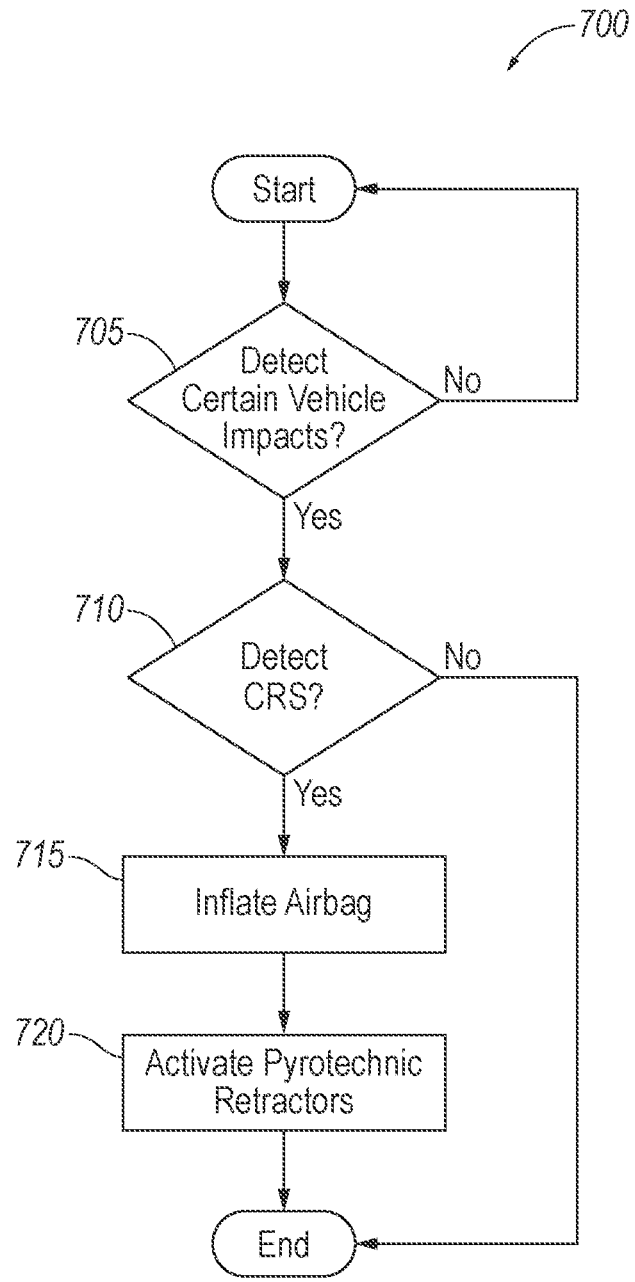
FIG. 7 is a flow chart of an example method executable by a computer of the vehicle.

With reference to FIG. 7, the computer 34 stores instructions to control components of the vehicle 12 according to the method 700. Specifically, the method 700 includes, generally, inflating the airbag 26 and activating the pyrotechnic retractors 32 to position the cavity 28 of the airbag 26 at the occupant-seating area 24. Use of "in response to," "based on," and "upon determining" herein, including with reference to method 700, indicates a causal relationship, not merely a temporal relationship.

With reference to decision block 705, the method 700 includes detecting certain vehicle impacts. The impact sensors 102 may identify certain vehicle impacts. If no vehicle impact is detected, the method 700 returns to start. If a certain vehicle impact is identified, the method 700 moves to decision block 710.

With reference to decision block 710, the method 700 includes detecting an occupant in the occupant-seating area 24. Specifically, the occupancy sensor 104, as described above, may detect occupancy of the occupant-seating areas 24 by a CRS 30 and/or another occupant. In such an example, the occupancy sensor 104 communicates the detection of the occupant and the information regarding the type of occupant to the computer 34, e.g., by sending a signal over the vehicle communication network 106. In the event no occupant is detected, the method 700 ends. In the event an occupant is detected, the method 700 proceeds as described below.

Specifically, with reference to block 710, the method 700 ends in response to detection of certain vehicle impacts and no detection of a removable CRS 30 on the occupant-seating area 24. In other words, the airbag 26 is not inflated in the event no removable CRS 30 is detected. For example, if an adult occupant seated directly on the occupant-seating area 24 is detected or no removable CRS 30 is detected, the airbag 26 does not move to the inflated position and the method 700 ends. If a removable CRS 30 is detected, the method 700 continues to block 715.

With reference to block 715, based on detection of a removable CRS 30, the method 700 includes inflating the airbag 26 to the inflated position. The computer 34 may send a signal to the inflator 70 to move the airbag 26 to the inflated position. The inflator 70 may fill the airbag 26 with inflation medium to move the airbag 26 to the inflated position.

With reference to block 720, the method 700 includes activating the pyrotechnic retractors 32. The pyrotechnic retractors 32 are activated and the pyrotechnic retractors 32 retract the tethers 100 to the retraced position to position the cavity 28 of the airbag 26 at the occupant-seating area 24. The pyrotechnic retractors 32 lock to maintain the tethers 100 in the retracted position. The method 700 ends after the pyrotechnic retractors 32 are activated to retract the tethers 100.

The disclosure has been described in an illustrative manner, and it is to be understood that the terminology which has been used is intended to be in the nature of words of description rather than of limitation. The numerical adverbs "first" and "second" are used herein merely as identifiers and do not signify order or importance. Many modifications and variations of the present disclosure are possible in light of the above teachings, and the disclosure may be practiced otherwise than as specifically described.

What is claimed is:

1. An assembly comprising:
a vehicle seat having a seat bottom and a seatback supported by the seat bottom, the seat bottom having a seat-forward end and a seat-rearward end;
the seat bottom defining an occupant-seating area;
an airbag supported on the seat bottom at the seat-forward end, the airbag being inflatable from an uninflated position to an inflated position;
the airbag in the inflated position having a cavity configured to receive a removable child-restraint system on the occupant-seating area;
a pyrotechnic retractor supported by the vehicle seat and operatively coupled to the airbag to position the airbag with the cavity at the occupant-seating area; and
a computer including a processor and a memory storing instructions executable by the processor to:
detect a removable child-restraint system on the occupant-seating area; and
based on detection of a removable child-restraint system on the occupant-seating area, inflate the airbag to the inflated position in response to certain vehicle impacts.

2. The assembly of claim 1, wherein:
the airbag includes a first side portion and a second side portion spaced in from each other, a seat-forward portion, and a seat-upward portion to define the cavity;
the occupant-seating area being between the first side portion and the second side portion along a cross-seat axis when the airbag is in the inflated position;
the occupant-seating area being between the seat-forward portion and the seatback along a seat-forward axis; and
the occupant-seating area being between the seat-upward portion and the seat bottom along a seat-upright axis.

3. The assembly of claim 1, wherein the vehicle seat defines a first side and a second side spaced from the first side, the airbag extending from the first side to the second side and the occupant-seating area being between the first side and the second side.

4. The assembly of claim 1, further comprising a tether extending from the pyrotechnic retractor to the airbag, the pyrotechnic retractor being operatively coupled to the tether to position the airbag with the cavity at the occupant-seating area.

5. The assembly of claim 4, further comprising a second pyrotechnic retractor supported by the vehicle seat, the second pyrotechnic retractor being spaced from the pyrotechnic retractor and operatively coupled to the airbag to position the airbag with the cavity at the occupant-seating area.

6. The assembly of claim 5, further comprising a second tether spaced cross-seat from the tether, the second pyrotechnic retractor being operatively coupled to the second tether to position the airbag with the cavity at the occupant-seating area.

7. The assembly of claim 6, further comprising a third tether spaced downwardly from the second tether along the airbag, the third tether extending from the second pyrotechnic retractor to the airbag and the second pyrotechnic retractor being operatively coupled to the third tether to position the airbag with the cavity at the occupant-seating area.

8. The assembly of claim 5, wherein the pyrotechnic retractor and the second pyrotechnic retractor are supported by the seatback.

9. The assembly of claim 4, further comprising a second tether spaced downwardly from the tether along the airbag, the second tether extending from the pyrotechnic retractor to the airbag and the pyrotechnic retractor being operatively coupled to the second tether to position the airbag with the cavity at the occupant-seating area.

10. The assembly of claim 1, further comprising a second pyrotechnic retractor supported by the vehicle seat, the second pyrotechnic retractor being spaced from the pyrotechnic retractor and operatively coupled to the airbag to position the airbag with the cavity at the occupant-seating area.

11. The assembly of claim 10, wherein the vehicle seat defines a first side and a second side spaced from the first side, the pyrotechnic retractor being supported by the first side of the vehicle seat and the second pyrotechnic retractor supported by the second side of the vehicle seat.

12. The assembly of claim 1, wherein the pyrotechnic retractor is supported by the seatback.

13. The assembly of claim 1, wherein the airbag includes a first inflation chamber and a second inflation chamber, the first inflation chamber and the second inflation chamber defining a gap elongated between the first inflation chamber and the second inflation chamber from the seat bottom to the seatback.

14. The assembly of claim 13, further comprising a buckle fixed to one of the first inflation chamber and the second inflation chamber and a clip fixed to the other of the first inflation chamber and the second inflation chamber, the clip being releasably connectable to the buckle.

15. The assembly of claim 13, wherein the first inflation chamber is releasably connectable to the second inflation chamber at the gap.

16. The assembly of claim 1, wherein the airbag includes a first inflation chamber and a second inflation chamber, the first inflation chamber and the second inflation chamber defining a gap elongated between the first inflation chamber and the second inflation chamber from a first end spaced upwardly from the seat bottom to a second end adjacent the seatback.

17. The assembly of claim 16, further comprising a buckle fixed to one of the first inflation chamber and the second inflation chamber and a clip fixed to the other of the first inflation chamber and the second inflation chamber, the clip being releasably connectable to the buckle.

18. The assembly of claim 16, wherein the first inflation chamber is releasably connectable to the second inflation chamber at the gap.

19. The assembly of claim 1, further comprising a vehicle floor supporting the vehicle seat, the airbag being between the seat bottom and the vehicle floor in the uninflated position.

20. The assembly of claim 1, wherein the occupant-seating area is between the airbag and the seatback when the airbag is in the inflated position.

* * * * *